United States Patent [19]
Retotar

[11] Patent Number: 4,591,963
[45] Date of Patent: May 27, 1986

[54] TECHNIQUE FOR REDUCING LINE CURRENT HARMONICS AT INPUT TO POWER SUPPLY ACTING AS NONLINEAR LOAD

[75] Inventor: Daniel D. Retotar, Randolph, N.J.

[73] Assignee: AT&T Bell Laboratories, Murray Hill, N.J.

[21] Appl. No.: 602,695

[22] Filed: Apr. 23, 1984

[51] Int. Cl.[4] .................................. H02M 3/335
[52] U.S. Cl. ........................ 363/17; 363/98; 363/37
[58] Field of Search ............ 363/40, 41, 49, 17, 363/98, 126, 132, 37; 323/205, 901

[56] References Cited

U.S. PATENT DOCUMENTS

| | | | |
|---|---|---|---|
| 3,913,002 | 10/1975 | Steigerwald et al. | 363/18 |
| 4,193,111 | 3/1980 | Wester | 363/126 |
| 4,293,905 | 10/1981 | Opal | 363/124 |
| 4,340,931 | 7/1982 | Endo et al. | 363/124 |
| 4,472,672 | 9/1984 | Pacholok | 363/41 |
| 4,489,371 | 12/1984 | Kernick | 363/98 |

Primary Examiner—Peter S. Wong
Assistant Examiner—Judson H. Jones
Attorney, Agent, or Firm—Alfred G. Steinmetz

[57] ABSTRACT

Harmonic currents of the line frequency on the input line of a power converter are significantly reduced by actively controlling the input current to have substantially the same waveform and be in phase with the input AC sinusoidal voltage. Specific peak current control techniques are utilized to constrain current in an input inductor to be in phase with and approximate in waveform the input voltage sinusoidal waveform by operating a switch at a much higher frequency than that of the input AC voltage source; with the peak current control using the input AC voltage as a controlling reference voltage waveform.

8 Claims, 7 Drawing Figures

TECHNIQUE FOR REDUCING LINE CURRENT HARMONICS AT INPUT TO POWER SUPPLY ACTING AS NONLINEAR LOAD

GOVERNMENT CONTRACT

The Government has rights in this invention pursuant to Contract No. N00024-81-C-7318 awarded by the Department of the Navy.

TECHNICAL FIELD

This invention relates to AC to DC converters and more particularly to converters including active control means for substantially reducing harmonic distortion of AC input currents to the converter.

BACKGROUND OF THE INVENTION

AC to DC converters and controlled rectifier circuits, due to the chopping action of their power switches, present a nonlinear load to an AC linear power source causing harmonic currents to be generated which are fed back to the AC linear power source line. These harmonic currents, in conjunction with the AC source impedance, generate voltage components with highly distorted waveforms which appear across and adversely affect the performance of other electronic circuits connected to the power source transmission line. These excessive harmonic currents also cause a low power factor condition, thereby greatly reducing the efficiency of the transmission line. When this power factor condition is caused by a converter with a capacitive input filter, high inrush currents can occur at initial start up of the converter. The adverse effects of these harmonic currents have priorily been compensated for by using filter circuitry to divert the harmonic currents to a ground reference or by generating compensating currents designed to cancel or neutralize the harmonic currents.

More fundamental approaches have involved redesign of the converter or rectifier circuit to modify the nature of its apparent input impedance. An example of such an approach is disclosed in U.S. Pat. No. 3,913,002 issued to R. L. Steigerwald on Oct. 14, 1975, wherein a load current is controlled by comparing it with a reference waveform in phase with the line voltage using a comparator circuit with a defined hysteresis to define switching band limits at the power switches about the reference waveform. This control system shapes the input line current in response to a particular reference waveform selected to obtain a desired power factor which minimizes line current harmonics.

These prior arrangements may be unsuitable in specific applications as a consequence of not having a fixed switching frequency control scheme. For example, since the switching frequency is dependent upon the load characteristics, varying load conditions may cause the frequency to be in the audible range, creating acoustic noise problems. The variable switching frequency may also make high frequency transformer isolation difficult or impractical, especially if the load characteristics are not known.

Although the prior arrangements reduce the line frequency harmonic currents, significant switching frequency harmonic currents may be generated if the topology employed produces discontinuous input currents. This often requires excessive input filtering, especially at high power levels where RMS currents are very large.

SUMMARY OF THE INVENTION

The harmonic currents on the input line to a converter circuit, including control circuitry embodying the principles of the invention, are significantly reduced by actively controlling the input current to the converter to have substantially the same waveform and be in phase with the input AC sinusoidal voltage. Specific peak current control (PCC) techniques are utilized to constrain continuous current in an input inductor to be in phase with and approximate in waveform the sinusoidal waveform of the line voltage. This is achieved by operating a power switch arrangement controlling current continuity in this inductor at a high frequency relative to the line frequency using peak current control. The peak current control level is derived by using the AC line voltage as a reference voltage waveform.

The input AC voltage to the AC to DC converter is rectified and applied to the input energy storage inductor through a high frequency filter to limit the switching frequency harmonic currents generated by the action of the power switches on the input energy storage inductor. The current in the input energy storage inductor is controlled so that it is maintained continuous throughout each cycle of operation and that, after filtering, it closely resembles the input voltage waveform in shape and phase. Controlling the input current in this manner imparts a linear, resistive input impedance to the converter.

BRIEF DESCRIPTION OF THE DRAWING

An understanding of the invention may be readily attained by reference to the following specification and drawing in which.

DETAILED DESCRIPTION

Figure 1:
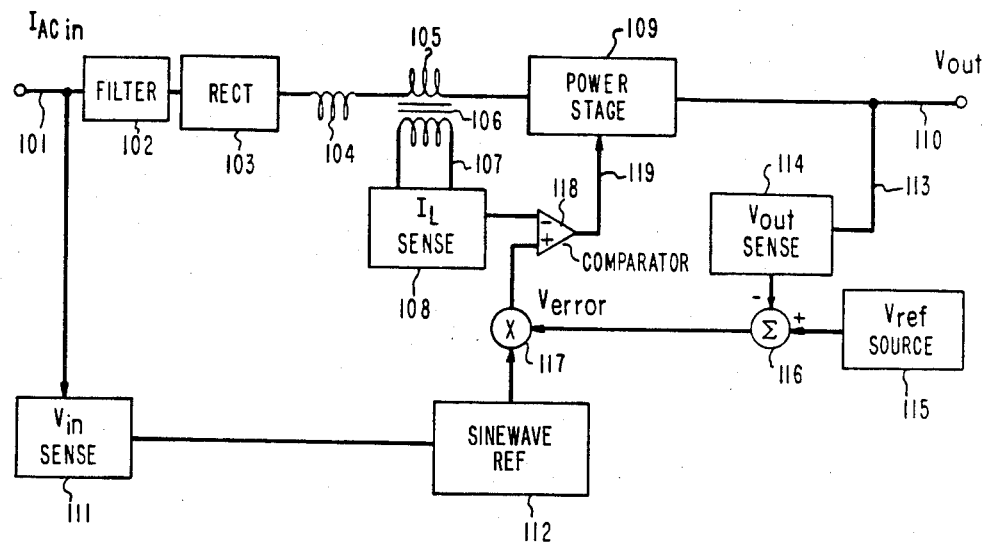
FIG. 1 discloses a functional block diagram for explaining the principles of operation of a converter embodying the principles of the invention.

The block diagram of FIG. 1 discloses a functional arrangement of a converter circuit embodying the principles of the invention. An AC signal input at input lead 101 is supplied by a bus or commercial line to which other circuits are connected; the input impedance of the converter being apparent to the line at this point. An input impedance that is apparent as highly nonlinear will induce harmonic currents on the AC input line. Since the AC source and line have non-zero impedances, these currents will cause harmonic voltages to appear across other circuits connected to the line. These harmonic currents will additionally cause power to be delivered to the converter with a low power factor.

Figure 2:
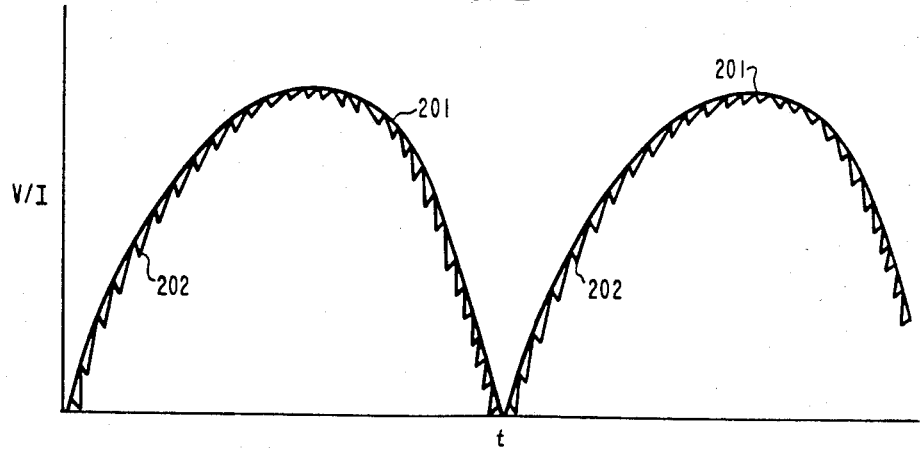
FIG. 2 discloses voltage and current waveforms useful in explaining operation of a circuit embodying principles in accord with the invention disclosed in the block diagram of FIG. 1.

The input power applied to lead 101 is coupled, via a filter inductor 102, to a rectifier circuit 103 whose output voltage is a full-wave rectified sinusoidal waveform as shown by waveform 201 in FIG. 2. The output of the rectifier 103 is applied to an energy storage inductor 104 in which continuous current conduction is maintained. Rectifier 103, inductor 104 and the subsequent power switching devices of the power stage 109 comprise a boost type converter circuit. Hence, the inductor 104 is operated around a minor hysteresis loop and a continuous unidirectional current flow is maintained therein. This current is sensed by a current sensing winding 105 of current sensing transformer 106. A signal representative of this current appears on secondary winding 107 and is detected by a current level sensing circuit 108.

The power stage circuit 109 includes power switching devices and filtering and rectifying circuitry so that a DC voltage appears at output terminal 110. The DC voltage at the terminal 110 is coupled, via lead 113, to a voltage sensing circuit 114. This sensed voltage is summed in summing amplifier 116 with a reference voltage supplied by a reference voltage source 115 in order to generate an error voltage that is representative of a deviation of the output voltage from its regulated value.

The input voltage waveform at lead 101 is sensed by a voltage sensing circuit 111 that transmits the waveform to a voltage reference waveform generator 112 that utilizes the frequency and phase information to produce a reference waveform of fixed amplitude. This sinusoidal reference waveform is multiplied in multiplier 117 with the error voltage to generate an amplitude modulated control sinewave voltage which is compared by voltage comparator 118 to a voltage representing the inductor current supplied by current sensing circuit 108.

The output of the voltage comparator 118 is applied via lead 119 to control the on/off conductivity state of power switches in the power stage 109. In accord with peak current control techniques (as shown by the current waveform 202 in FIG. 2) the current in inductor 104 is allowed to increase or charge up with a ramp waveform by having a power switch conduct as long as the output voltage of sensing circuit 108, which is a representation of the current in inductor 104, is less than the amplitude of the sinewave control voltage produced by multiplifer 117. When its voltage amplitude equals the sinewave control voltage, the power switch isbiased into a non-conductive state and the current in the inductor is allowed to decay for a fixed time interval whereupon the charging ramp current sequence is reinitiated. The overall effect of this control (as shown in FIG. 2) is a series of current charge and discharge ramps whose peak amplitude has a curve envelope that matches the sinewave control voltage waveform 201. It is apparent that by controlling the power switch devices at the power stage 109 using peak current control techniques that the input current to the power stage is controlled to resemble a sinusoidal signal and is further constrained to be in phase with the sinusoidal line voltage. Hence, the input impedance of the converter is resistive to the input AC voltage and presents little reactive impedance to the line; and accordingly, generates substantially no unwanted line frequency harmonic currents. A further advantage is that the peak current control method regulates the DC voltage output at output terminal 110 as with the schematics of the converter circuit of FIG. 1.

Figure 3:
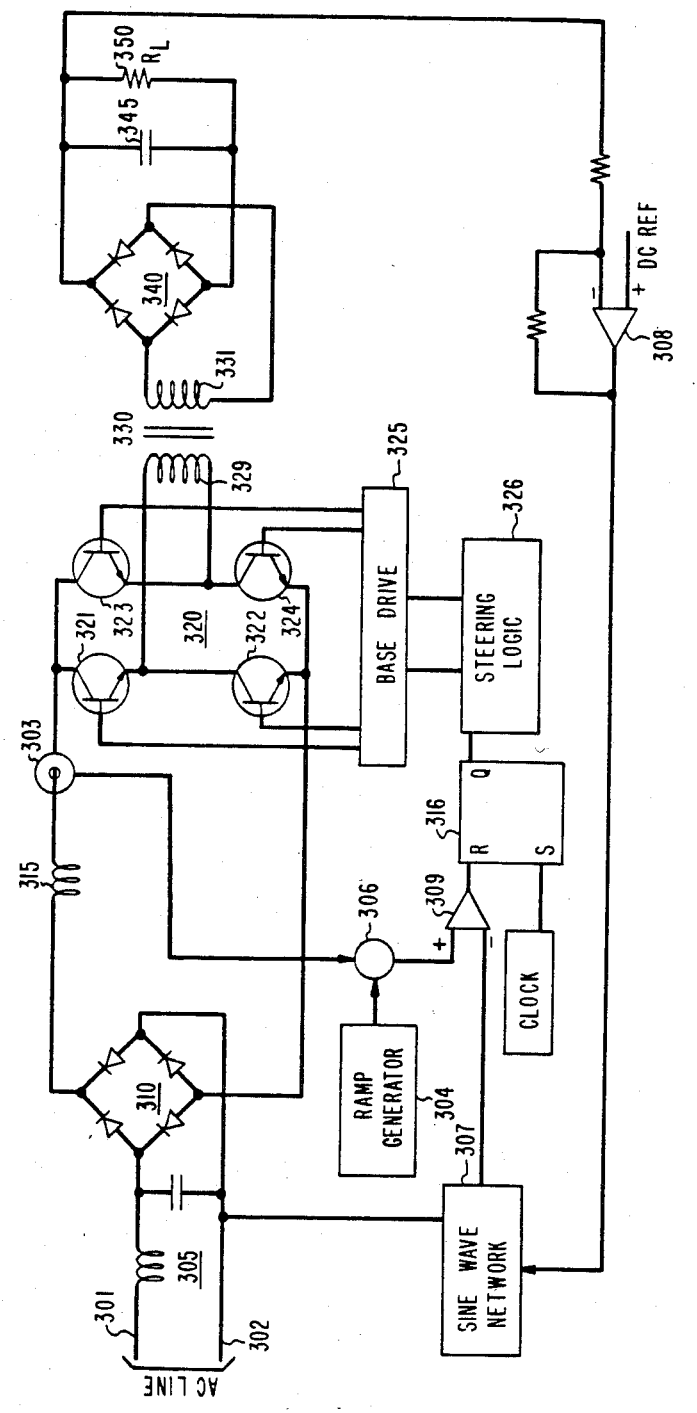
FIG. 3 is a partial block and schematic of an AC to DC converter embodying the principles of the invention.

The more detailed block schematic of FIG. 3, discloses a power stage including a bridge type inverter circuit 320. A power transformer 330 provides ground isolation between the input at terminals 301 and 302 and the output load impedance 350. The input leads 301 and 302 energized by the AC line are coupled via a filter circuit 305 to a fullwave bridge rectifier 310, which in turn, supplies a halfwave sinusoidal voltage via energy storage inductor 315 to the bridge inverter circuit 320.

Bridge inverter circuit 320 includes four power switching transistors 321, 322, 323, and 324 each in a separate arm of the bridge. The on-off conductivity states of these power switching transistors is controlled by a basedrive circuit 325 which provide the proper drive signals to achieve the desired conductivity states. The drive signal output is under control of the steering logic circuit 326 so that transistors 321 and 324 at some point within each cycle have a conductivity state opposite that of transistors 322 and 323 and vice versa. The transistor switches in the opposite arms of the bridge may be operated with a slight overlap of conductivity; due to the current limiting effect of storage inductor 315. In fact, this current overlap effect is utilized to initiate current flow in inductor 315 by biasing all four transistor switches 321-324, simultaneously, conducting.

The resulting alternating signal of the bridge inverter 320 is applied to primary winding 329 of transformer 330 and coupled by secondary winding 331 to a fullwave bridge rectifier 340. Output from this rectifier 340 is coupled via voltage stabilizing capacitor 345 to the load impedance 350.

The input voltage waveform at input leads 301 and 302 is sensed and reproduced with a controlled amplitude value by the sinewave generation network 307. The amplitude level is controlled by an error voltage supplied by error amplifier 308; in response to the output load voltage as compared with a DC reference voltage. The amplitude of the sinewave control voltage output of the sinewave network 307 is controlled by the error voltage and is applied to the inverting input of a comparator amplifier 309.

The current in inductor 315 is sensed at node 303 which represents a sensing device which may comprise a current sensing transformer. This sensed current signal is summed with a generated ramp signal supplied by ramp generator 304 in a summing circuit 306 and the result; thereof, applied to a non-inverting input of comparator amplifier 309. The purpose of the added ramp signal is to insure stability of the PCC circuit by increasing the natural ramp of the inductor current to define with certainity the intersection point where the increasing inductor current signal reaches the amplitude level set by the sinewave control amplitude.

When the increasing ramp signal reaches the amplitude of the sinewave control signal, the output of comparator amplifier 309 resets a flip flop 316 whose output to the steering logic 326 changes routing of the drive signals and causes the conducting transistor to be biased non-conducting. The power switch transistors 321-324 are operated so that the current in inductor 315 is continuous with the inductor being operative around a minor hysteresis loop.

Figure 4:
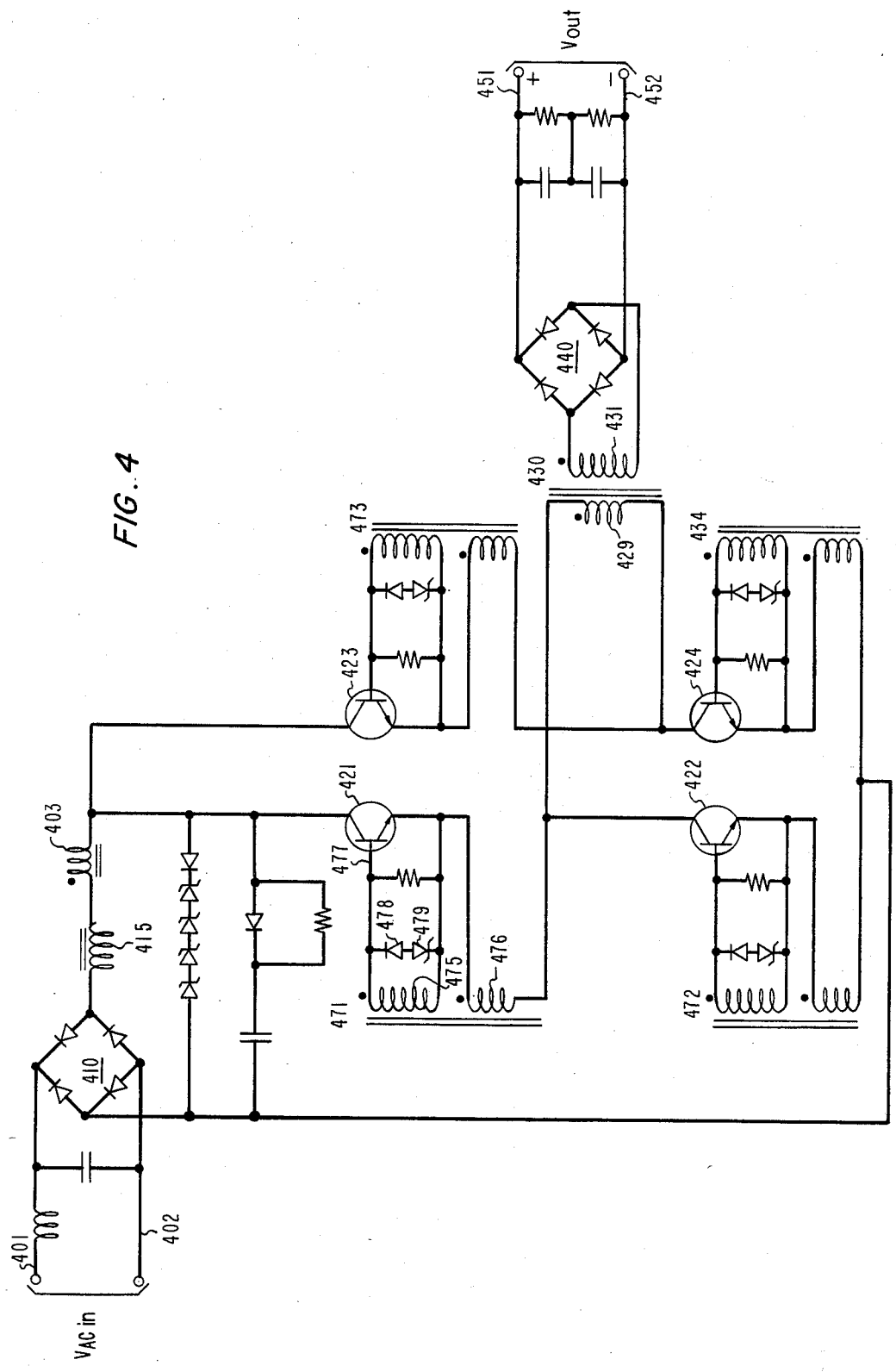
FIG. 4 is a schematic of the power train portion of the converter circuit of FIG. 3.

The power train portion of the converter is shown in more detail in FIG. 4. As previously described, the AC source is coupled to input terminals 401 and 402 and the AC signal is rectified by bridge rectifier 410. The resulting halfwave sinusoidal signal is coupled through the energy storage inductor 415 and current sensing winding 403 to the collector terminals of the power switch transistors 421 and 423. The added power switch transistors 422 and 424 complete a bridge inverter circuit. Base drive for the transistors 421–424 is supplied through the drive transformers 471–474. The primary or drive windings of these transformers are described in FIG. 6 and will be discussed subsequently. Transformer 471 includes a secondary winding 475 and a feedback winding 476. Secondary winding 475 couples the drive bias pulse to the base 477 of transistor 471. Breakdown diode 479 provides a voltage to reset the core of transformer 471. Diode 478 prevents forward biasing of diode 479. The secondary winding 475 provide base drive current which is proportional to collector current flow (as sensed by feedback winding 476) through the power switch transistor 421 to insure operation in the saturation region. Secondary winding 475 also provides added drive at turn on, which reduces the duration of turn on; and hence, reduces power dissipation with transistor 421 during turn on. It also produces a sweep out effect at turn off to reduce power dissipation at that occurrence. The transformers 472, 473 and 474 and the associated bias circuitry are identical to that of transformer 471; and hence, these circuits are not described separately. Output from the bridge inverter is through the primary winding 429 of power transformer 430 which shunts the bridge inverter. The output signal on secondary winding 431 is rectified by bridge rectifier 440 and coupled to the output terminals 451 and 452.

Figure 5:
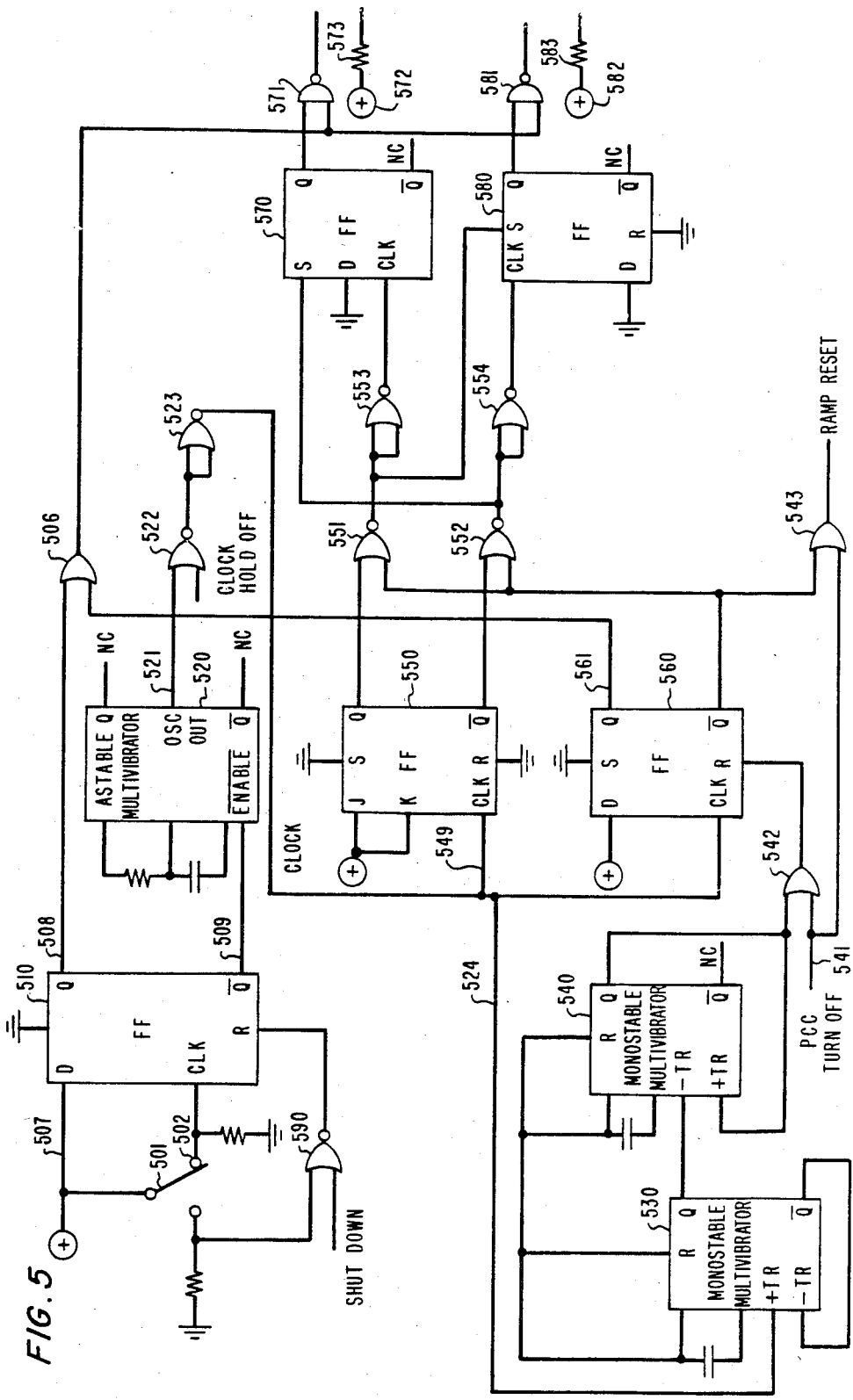
FIG. 5 is a schematic of the circuitry for generating the drive signals for the power switches in FIG. 4.

The logic circuitry for controlling the drive pulse timing is shown in FIG. 5. Pulse drive action is initiated by a connection of switch 501 to the on terminal 502 which clocks D type flip flop 510 to respond to the positive voltage at its D terminal 507. Flip flop 510 provides protection to the logic circuitry from bounce effects of the switch 501 when it is connected to on terminal 502. Its output on lead 509 enables a subsequent free running multivibrator or clock 520 which generates the necessary clock pulses from which the periodic timing of the drive pulses at the power switches is derived. The output of clock 520 on lead 521 is coupled to the series connected NOR gates 522 and 523 to the clock inputs of the JK flip flops 550 and 560.

These clock pulses are also coupled via lead 524 to the triggered monostable circuit 530 whose output is coupled to a second triggered monostable circuit 540 whose output, in turn, is coupled via OR gate 542 to the reset input of flip flop 560. These two monostable circuits coupled in tandem have their respective timing circuits set to control the maximum pulse width of the power switches if no peak current control signal is received.

The pulse input to the clock input lead 549 of JK flip flop 550 causes it to toggle and alternately apply signals to NOR gates 551 and 552, respectively. Their alternating outputs are coupled, via NOR gates 553 and 554 to alternately clock D type flip flop 570 and 580 to generate the periodically alternating and overlapping drive pulses. The output of NOR gates 551 and 552 are additionally cross coupled to alternately set the two D type flip flops 570 and 580. The outputs of flip flops 570 and 580 are coupled, via NAND gates 571 and 581 and pull-up resistors 573 and 583 to the light emitting diode 671 and 681; respectively, which are shown in FIG. 6.

The NAND gates 571 and 581 are each enabled by the output of flip flop 510 on lead 508 coupled to NAND gates 571 and 581 via OR gate 506.

Figure 7:
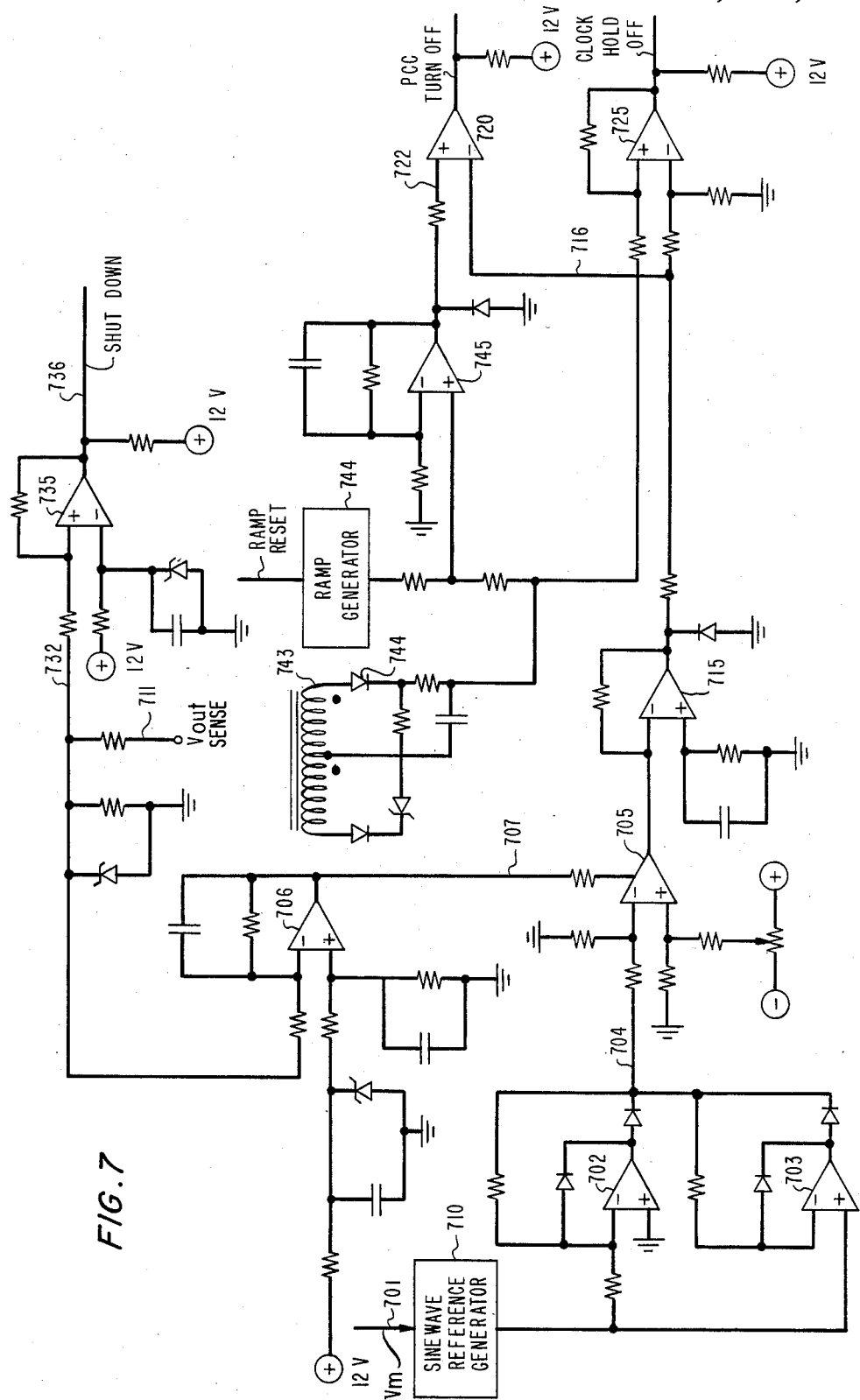
FIG. 7 is a schematic of the peak current control regulation circuitry for regulating the power and drive circuitry of FIGS. 4-6.

The time duration of the pulse output of NAND gates 571 and 581 is controlled by the control signal provided by the peak current control regulatory circuitry of FIG. 7. This control signal is provided at input lead 541 to OR gate 542. This signal causes D type flip flop 560 to be reset. Its reset output on lead 561 is transmitted, via gate 506 to disable the two NAND gates 571 and 581; and hence, disable transmission of the drive signal. This peak current control signal is also coupled via OR gate 543 to reset the ramp generator shown in FIG. 7. The timing arrangement of tandem connected multivibrators 530 and 540 operates to set a maximum pulse duration should the peak current control fail to supply a terminating signal at lead 541.

Figure 6:
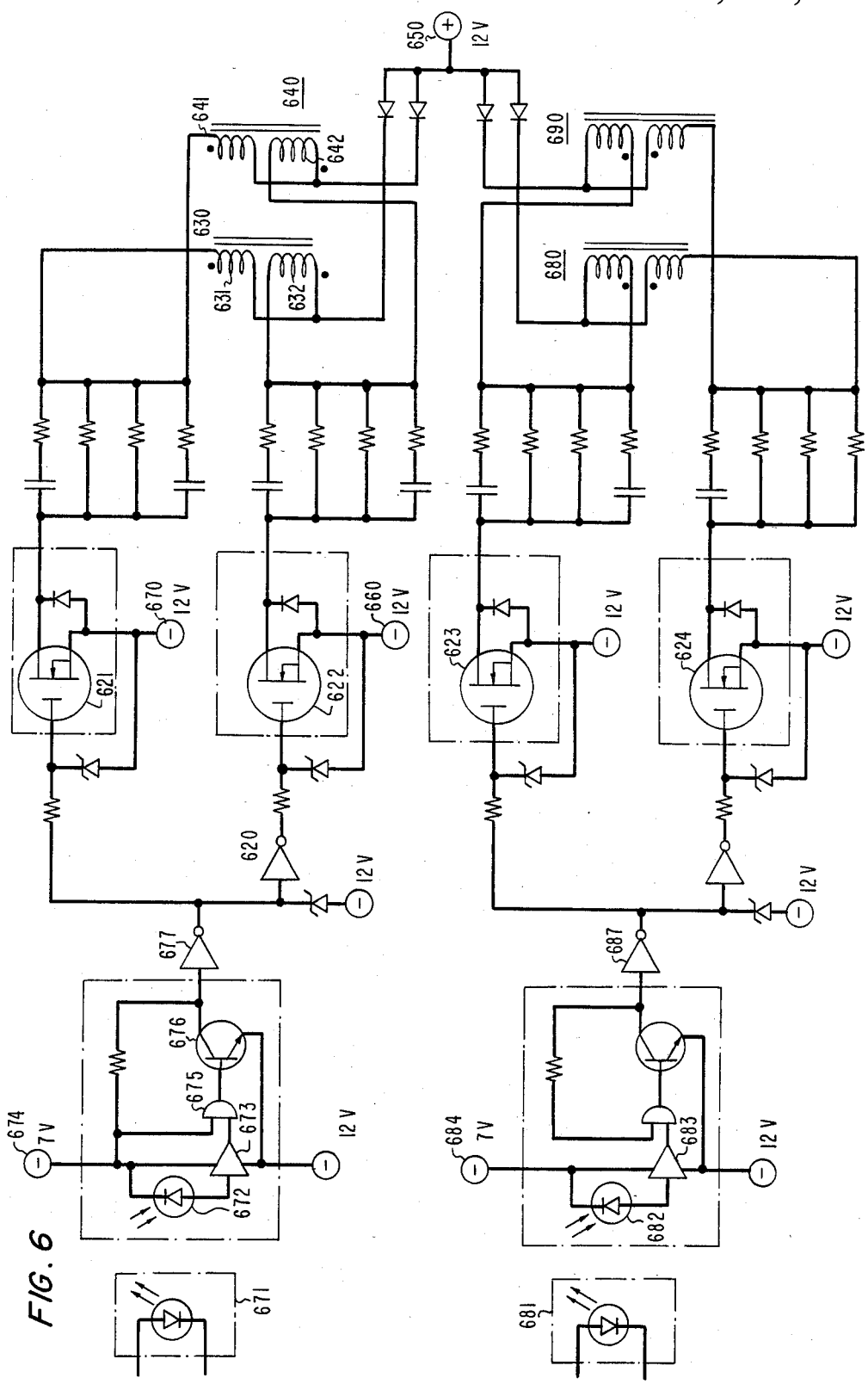
FIG. 6 is a schematic of the circuitry for processing the drive signals generated by the circuit in FIG. 5 and applying these processed drive signals to the power switches in FIG. 4.

The pulse output of NAND gates 571 and 581 are coupled through light emitting diode 671 and 681 of FIG. 6 to control the connection of voltage sources 572 and 582 on FIG. 5. The light emissions of the diodes 671 and 681 are sensed by detecting diodes 672 and 682, in FIG. 6 energized by voltage sources 674 and 684, respectively.

Activation of either of the detecting diodes 672 or 682 couples the input of amplifier 673 or 683 to a negative voltage source 674 or 684, respectively. When the negative input voltage is applied to amplifier 673, for example, AND gate 675 is enabled to turn on transistor 676 and energize the subsequent polarity inverter 677 with a negative signal. As is readily apparent, the polarity inverters 677 and 687 are driven in response to and in synchronism with the output of light emitting diodes 671 and 681, respectively.

The output of polarity inverter 677 is coupled directly to a FET switch 621 and through a polarity inverter 620 to FET switch 622. It is apparent that the conductivity states of FET switches 621 and 622 will always be in opposite conductivity states relative to one another. Conductivity in FET switch 621 completes a current path from a positive source 650 through transformer windings 631 and 641 to the negative voltage source 670. Similarly conductivity in FET switch 622 enables current flow from positive voltage source 650 through transformer windings 632 and 642 to negative voltage source 660. The transformers 630 and 640 are the drive input transformers 471 and 474 in FIG. 4 which provide drive signals to bias the power switch transistors 421 and 424 into a conductive state. Signal flow through windings 631 and 641 provide turn off signals while turn on signals are provided by current flow through windings 632 and 642. Drive for the alternating conducting power switch transistors 422 and 423 is provided through transformers 680 and 690 which are under the control of the FET switches 623 and 624. Since their operation is similar, a detailed description is not believed necessary.

The shutdown signal, turn off signals and clock hold off signals input to the control circuit of FIG. 5 are generated by the regulation circuitry disclosed in FIG. 7. This circuit is essentially responsive to the input sinusoidal waveform sensed at lead 701 and to the output voltage sensed at lead 711. The input sinewave at lead 701 is applied to a sinewave reference generator 710 which recreates the sinewave and applies it in parallel to the inverting and non-inverting inputs of the operational amplifiers 702 and 703; respectively, which are each operative for amplifying the alternate half cycles of the reference sinusoidal to some precise value. The output of amplifier 703 is coupled to the inverting input of amplifier 702 so that the adjacent half cycle of the sinusoidal each appear as a signal of the same polarity on lead 704 coupled to the inverting input of transconductance amplifier 705.

These rectified half cycle sinewave signals are applied via lead 704 to the transconductance amplifier 705 which is coupled via lead 707 so that its gain is error responsive to a signal output of the error amplifier 706.

The output voltage of the converter is sensed at input lead 711 and is coupled; therefrom, to the inverting input of amplifier 706. It is compared with a reference voltage at the non-inverting input to produce an error voltage output which is coupled by led 707 to control the gain of the transconductance amplifier 705 so that its output is responsive to the converter's output voltage.

The inductor current is sensed by winding 743, rectified by diode 744 and summed with the output of ramp generator 744 and coupled via amplifier 745 to the non-inverting input 722 at comparator amplifier 720.

The output signal of transconductance amplifier 705 is the peak current control signal which is coupled via amplifier 715 and lead 716 to the PCC (peak current control) turn off comparator 720. The amplifier 715 is a gain control amplifier used to adjust the sensitivity of the feedback loop.

It is readily apparent that when the sensed current signal on lead 722 exceeds the control current signal on lead 716, the output of comparator amplifier 720 changes state. The ramp signal is added to the sensed current signal to precisely define the transition point at which the comparator 720 switches its output state. This change of state coupled to lead 541 in FIG. 5 determines the pulse width of current conducted by the power switches.

The output voltage sensing lead 711 is also coupled, via lead 732, to comparator amplifier 735 and is used to generate a shutdown signal in response to over-voltage conditions. The shutdown signal on lead 736 coupled to OR gate 590 in FIG. 5 which, in turn, is connected to the reset input of flip flop 510. The resulting output on lead 509 is utilized to turn off the clock flip flop 520. This halts conduction of power transistor switches 421–424 in FIG. 4, thus, protecting them from damage caused by over-voltage.

The current control signal of amplifier 715 is also coupled to the inverting input of comparator amplifier 725 where it is compared with the rectified current signal applied to the non-inverting input. This amplifier is biased so that it will switch states at a predetermined current limit level and is operative to limit current output of the system when the output voltage has dropped to a very low level such as when a short circuit has occurred. The output signal of amplifier 725 is designated as a clock hold-off signal and is coupled to NOR gate 522 in FIG. 5.

What is claimed is:

1. A converter adapted for minimizing line frequency harmonic currents generated at a source of energy for a system comprising:
    input means,
    output means,
    power switching apparatus interposed between the input means and the output means and including a plurality of switching devices connected in a bridge network,
    inductive means for providing energy storage operating in a continuous current mode and coupled to supply current from the input means to the power switching apparatus,
    means for generating a reference waveform in phase with and of similar wave shape to an energizing waveform at the input means,
    means for generating an error voltage representative of a deviation of a voltage at the output means from a regulated value,
    means for adjusting an amplitude of the reference waveform in response to the error voltage, and
    means for driving the power switching apparatus in response to the means for adjusting and operative for controlling a current waveform in the inductive means to substantially equal the shape of the reference waveform and, further, being operative to bias all switching devices conductive simultaneously to initiate current flow in the inductive means.

2. A converter as defined in claim 1 wherein the means for adjusting comprises:
    a transconductance amplifier having an input from the means for generating a reference waveform and having its gain controlled by the means for generating an error voltage.

3. A converter as defined in claim 2 wherein the means for driving includes:
    means for sensing a current in the inductive means, and
    means for comparing an output of the means for sensing with an output of the transconductance amplifier.

4. A converter as defined in claim 3 wherein the means for sensing includes:
    means for comparing a sensed current with a generated error signal.

5. A converter having a control means for reducing harmonic distortion at an input comprising:
    means for rectifying an AC signal connected to the input means,
    means for pulse width modulating a current signal including power switching devices,
    inductive means coupling an output of the means for rectifying to the means for pulse width modulating,
    means for sensing a current level in the inductive means including a current transformer having a current sensing winding in series with a winding of the inductive means,
    means for generating a reference waveform having a waveshape substantially similar to the AC signal and being in phase therewith,
    means for sensing an output voltage of the converter and generating an error signal responsive to its deviations from a desired regulated value,
    means for adjusting an amplitude of the reference waveform in response to the error signal,
    means for comparing an amplitude of the current level with an amplitude of the reference waveform, and
    drive means for controlling the means for pulse width modulating in response to the means for comparing.

6. A converter as defined in claim 5 wherein the means for pulse width modulating includes a bridge inverter and the power switching devices comprise first, second, third and fourth power transistors.

7. A converter as defined in claim 5 wherein the means for generating a reference waveform includes first and second amplifiers for amplifying and rectifying adjacent half-cycles of the AC signal.

8. A converter as defined in claim 5 wherein the means for adjusting includes a transconductance amplifier responsive to the error signal, and the means for sensing a current level includes a ramp generator and means for superimposing a ramp output of the ramp generator upon the current level.

* * * * *